(12) United States Patent
Hu et al.

(10) Patent No.: US 12,438,963 B2
(45) Date of Patent: Oct. 7, 2025

(54) DEVICE AND METHOD FOR TRANSFERRING IDENTIFICATION AND/OR DATA FLOW CONTROL INFORMATION BETWEEN DEVICES

(71) Applicant: MAXLINEAR ASIA SINGAPORE PRIVATE LIMITED, Singapore (SG)

(72) Inventors: Chun Feng Hu, Singapore (SG); Ingo Volkening, Singapore (SG)

(73) Assignee: MAXLINEAR ASIA SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 18/440,884

(22) Filed: Feb. 13, 2024

(65) Prior Publication Data

US 2024/0187350 A1   Jun. 6, 2024

Related U.S. Application Data

(63) Continuation of application No. 17/806,942, filed on Jun. 14, 2022, now Pat. No. 11,902,172, which is a
(Continued)

(30) Foreign Application Priority Data

Feb. 21, 2019   (EP) .................................. 19158670

(51) Int. Cl.
*H04L 47/36*   (2022.01)
*H04L 47/12*   (2022.01)
(Continued)

(52) U.S. Cl.
CPC .......... *H04L 69/324* (2013.01); *H04L 47/365* (2013.01); *H04L 69/22* (2013.01)

(58) Field of Classification Search
CPC ....... H04L 47/36; H04L 47/365; H04L 47/12; H04L 69/22
See application file for complete search history.

(56) References Cited

U.S. PATENT DOCUMENTS

| 11,362,958 B2 | 6/2022 | Hu et al. |
| 11,902,172 B2 | 2/2024 | Hu et al. |

(Continued)

OTHER PUBLICATIONS

James McEachern Nortel Networks Canada "Proposed modifications to clauses 8 and 9 of item #2 of the living list of FR: D 371" ITU-T Draft Study Period 2001-2004, Jul. 21, 2003, International Telecommunication Union, Jul. 21, 2003, pp. 1-3.
(Continued)

*Primary Examiner* — Kent Krueger
(74) *Attorney, Agent, or Firm* — Buchalter; Jason W. Croft (57) ABSTRACT

A device and a method for communicating with a link partner device. The device may include a fragmentation unit configured to fragment a packet into multiple fragments if a size of the packet is greater than a maximum fragment size, a packet control header unit configured to generate a packet control header for a packet or each fragment of the packet, and a transceiver configured to send the packet or the fragments of the packet with the packet control header via a connection between the device and the link partner device. The packet control header may include a data flow control field for congestion control between the device and the link partner device, the data flow control field including a configuration parameter indicative of a flow control capability being supported by the device.

20 Claims, 6 Drawing Sheets

Related U.S. Application Data continuation of application No. 16/784,360, filed on Feb. 7, 2020, now Pat. No. 11,362,958.

(51) Int. Cl.
  *H04L 69/22* (2022.01)
  *H04L 69/324* (2022.01)

(56) References Cited

U.S. PATENT DOCUMENTS

| | | | |
|---|---|---|---|
| 2002/0064190 A1* | 5/2002 | Sikora | H04L 69/22 370/537 |
| 2008/0181213 A1* | 7/2008 | Ovsiannikov | H04L 69/169 370/389 |
| 2009/0086759 A1 | 4/2009 | Heise et al. | |
| 2010/0166015 A1 | 7/2010 | van Greunen et al. | |
| 2015/0078383 A1 | 3/2015 | Wisehart | |
| 2015/0373162 A1 | 12/2015 | Mosko et al. | |
| 2016/0204887 A1 | 7/2016 | Lee et al. | |
| 2016/0270040 A1 | 9/2016 | Stanwood et al. | |
| 2018/0241727 A1 | 8/2018 | Verzun et al. | |
| 2020/0274818 A1 | 8/2020 | Hu et al. | |

OTHER PUBLICATIONS

Examination Report mailed Jun. 15, 2021 in European Patent 19158670.0.

Examination Report in European Application No. 19158670.0 mailed Sep. 22, 2022.

Martin Kuipers Adtran USA: "G.init: G.999.1 draft text;TD36",ITU-T Draft; Study Period 2017-2020; Study Group 15; Series TD36, International Telecommunication Union, Geneva ; CH, vol. 4/15 Aug. 21, 2018 (Aug. 21, 2018), pp. 1-24, XP044251641, Retrieved from the Internet: URL: https://www.itu.int/ifa/ifa/t/2017/sg15/docs/rgm/Q4-180827/TDT17SG15RGMQ4-180827-TD-0036-R10.docx [retrieved on Aug. 21, 2018].

Extended European Search Report for European Application No. 19158670.0, mailed Aug. 21, 2019.

Communication pursuant to Article 94(3) EPC for European Application No. 19158670.0, dated Dec. 11, 2023.

Office Action for European Patent Application No. 19158670.0 dated Aug. 23, 2024, 4 pgs.

Office Action of European Patent Application No. 19158670.0 mailed Aug. 6, 2025, 7 pages.

\* cited by examiner

FIG. 1

FIG. 2A — Format at Link or Physical Ports

FIG. 2B — Format at the reference point of Link/PHY reference point

DEVICE AND METHOD FOR TRANSFERRING IDENTIFICATION AND/OR DATA FLOW CONTROL INFORMATION BETWEEN DEVICES

CROSS REFERENCE TO RELATED APPLICATIONS

This application is a continuation of U.S. patent application Ser. No. 17/806,942, filed Jun. 14, 2022, which is a continuation of U.S. patent application Ser. No. 16/784,360, filed Feb. 7, 2020, which claims priority under 35 U.S.C. § 119 to European Patent Application No. EP19158670.0, filed Feb. 21, 2019, all of which are incorporated herein by reference in their entireties.

FIELD

Examples relate to a mechanism for interfacing between devices, more particularly a device and method for transferring identification and/or data flow control information between link partner devices.

BACKGROUND

ITU-T G.999.1 defines an interface between a link layer and a physical layer for digital subscriber lines (DSL) transceivers. The interface defined in ITU-T G.999.1 is a single point-to-point interconnection between a link layer device and a physical layer device. In accordance with ITU-T G.999.1, an identification of a packet or a fragment of the packet, and data flow control information are carried between the link layer and the physical layer. The interface defined in ITU-T 999.1 adds an additional tag, an Ethernet encapsulation header, and an additional frame check sequence (FCS) to each packet or fragment. The interface defined in ITU-T 999.1 also inserts a pause frame to carry data flow control information.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for a mechanism to transfer identification, priority information, and/or data flow control information without overhead in the interface between two link partner devices (e.g. a link layer device and a physical layer device).

Figure 1:
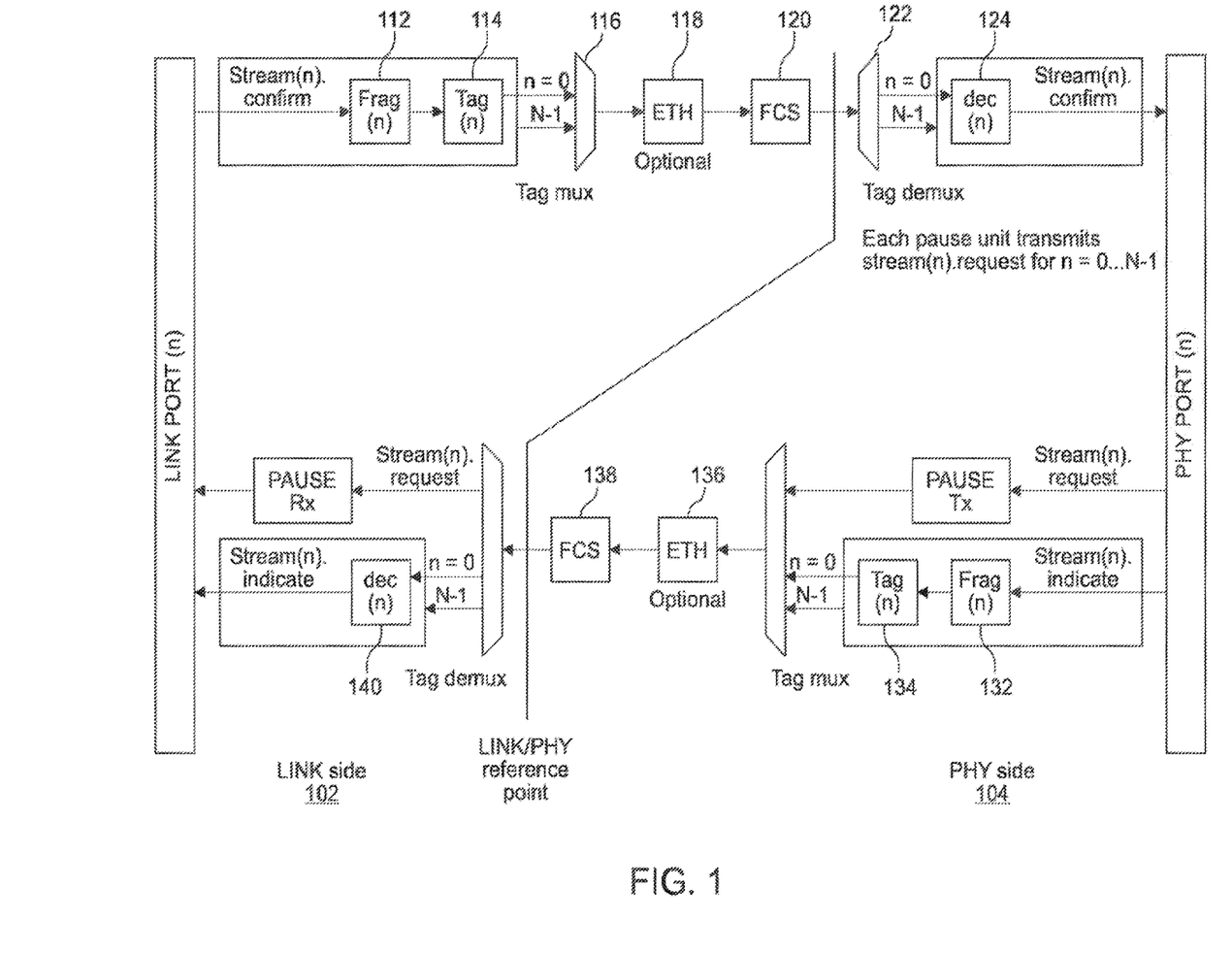
FIG. 1 shows the reference model defined in ITU.T G.999.1 for the interface between a link layer and a physical layer.

FIG. 1 shows the reference model defined in ITU.T G.999.1 for the interface between a link layer 102 and a physical layer 104. The ITU.T G.999.1 specification is incorporated herein as if fully set forth. Multiple streams (N streams) are supported between the link layer 102 and the physical layer 104. Stream(n).request is a primitive used by the physical layer 104 to request one or more packets from the link layer 102 to be transported, where n corresponds to an individual stream with n=0 . . . N−1 for a link layer-to-physical layer interface transporting N streams. Each pause frame transmits stream(n).request for n=0 . . . N−1. Stream (n).confirm is a primitive used by the link layer 102 to pass one or more packets to the physical layer 104 to be transported.

A packet is a block of data consisting of a certain number of octets for transport between a physical layer port and a link layer port. The fragmentation function 112 may divide a packet to multiple fragments if the size of the packet exceeds the maximum fragment size. If the length of the packet is less than or equal to the maximum fragment size, the packet is transmitted without fragmentation.

The tag function 114 adds an identification tag to each packet or fragment of a packet. The identification tag is inserted into a tag control identification (TCI) field (16 bits). The TCI field includes a start of fragment (SoF) bit (1 bit), an end of fragment (EoF) bit (1 bit), a data stream flag (1 bit), and a stream identification (SID) (13 bits). The data stream flag differentiates between a data frame (=1) and a pause frame (=0). The tag function may add a length field to indicate the number of bytes in a packet/fragment. The tagged packets or fragments on multiple streams are multiplexed by a multiplexer 116.

The Ethernet (ETH) adaptation block 118 adds fields to the tagged packets or fragments for compliance with the IEEE 802.3 format. The Ethernet adaptation block 118 adds a source medium access control (MAC) address field, a destination MAC address field, and a virtual local area network (LAN) tag protocol identifier (TPID) field to the tagged packets/fragments. The Ethernet adaptation block 118 may also append a padding field. The frame check sequence (FCS) block 120 adds an FCS field for error detection.

Figure 2A:
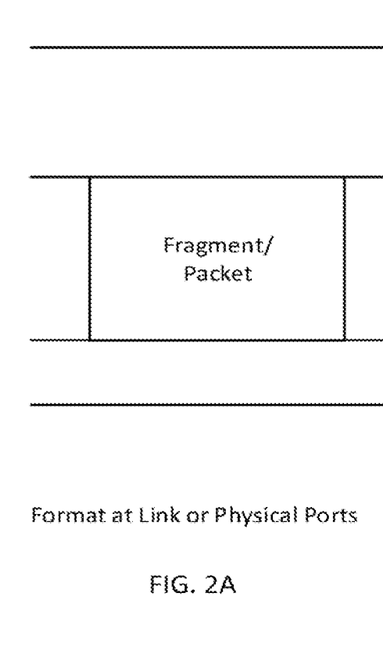
FIG. 2A shows a packet/fragment format without overhead.
Figure 2B:
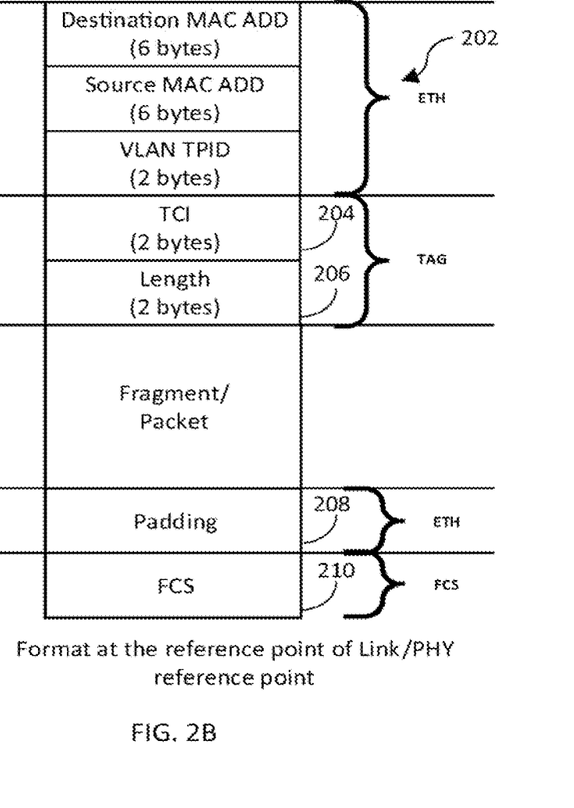
FIG. 2B shows a packet/fragment format with overhead.

FIG. 2A shows a packet/fragment format without overhead, (i.e. without any Ethernet header or tag). FIG. 2B shows a packet/fragment format with overhead. The Ethernet header 202 and the padding 208, the TCI field 204, the length field 206, and the FCS field 210 are all additional overheads.

Referring to FIG. 1, the tagged data packet or fragment is sent to the physical layer 104. The packets/fragments are demultiplexed for each stream by the demultiplexer 122. The decapsulation function 124 recovers the packets by performing the reverse functions (e.g. error verification and removal of the FCS field, removal of the Ethernet header fields, removal of the identification tag, and reassembly of fragments to a packet).

The packet transfer functions described above may also be implemented for transfer of packets from the physical layer 104 to the link layer 102. For the data transfer from the physical layer 104 to the link layer 102, the fragment function 132, the tagging function 134, the Ethernet function 136, and the FCS function 138 as explained above are performed in the physical layer, and the decapsulation function 140 is performed in the link layer 102.

Data flow control (DFC) is a mechanism that prevents congestion by ensuring that a transmitting device does not overwhelm a receiving device with data. To control the data flow from the link layer 102 to the physical layer 104, the physical layer 104 may send a pause frame to the link layer 102. Data flow control is implemented through a single pause frame containing the data flow states of all streams between the link layer 102 and the physical layer 104.

The DFC field contains N bits, where N represents the number of streams. The N data flow control bits represent the data flow control states for the stream with a stream identity (SID)=0 up to the stream with SID=N−1. A data flow control bit is set to '0' to request to stop transmission and set to '1' to request to resume transmission for the respective data stream. An Ethernet header is also added to the pause frame.

Examples are disclosed for a mechanism to transfer the identification and/or flow control information in the interface between devices (e.g. a link layer device and a physical layer device). In examples, the identification of a packet or a fragment of a packet may be carried in a packet control header (PCH) attached to each packet or fragment. In other examples, the data flow control information may be carried in the PCH attached to each data frame or fragment or an idle frame to eliminate the pause frame insertion. In other examples, priority information of the packet or fragment may be carried in the PCH of each frame/fragment to control quality of service (QoS) for the data packets. The identification information, the data flow control information, and the priority information, or any other information may be carried in the PCH independently.

Figure 3:
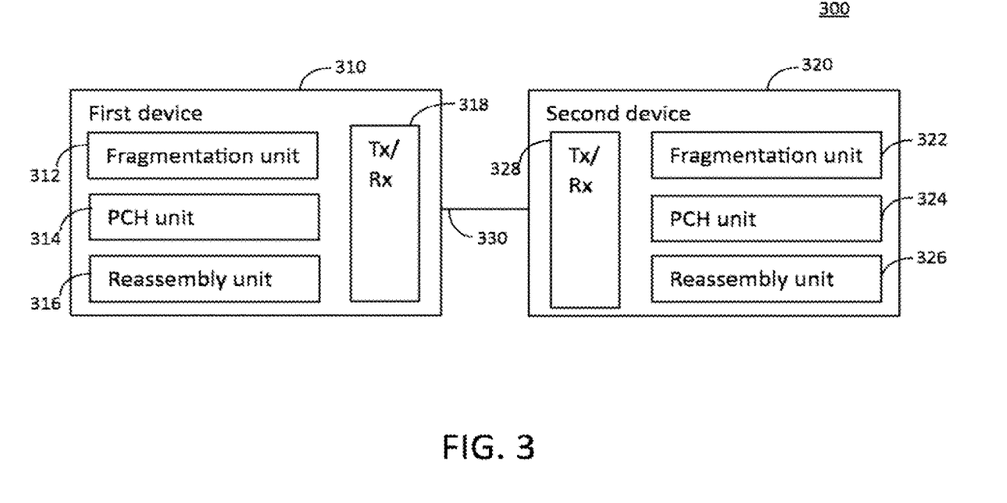
FIG. 3 is a block diagram of an example system in accordance with one example.

FIG. 3 is a block diagram of an example system in accordance with one example. The system 300 includes a first device 310 and a second device 320 that are connected over a connection 330. In one example, the first device 310 may be a link layer device and the second device 320 may be a physical layer device, or vice versa. For example, the link layer device may be an Ethernet switch, router, gateway, or the like, and the physical layer device may be a DSL physical layer chip.

Hereafter, the examples will be explained with reference to a connection between a link layer device and a physical layer device. Examples herein are explained in some parts with reference to ITU.T G.999.1 for the interface between a link layer and a physical layer. However, it should be noted that the examples disclosed herein are not limited to the interface defined in ITU.T G.999.1 or a link layer-to-physical layer interaction, but may be extended to any case where identification information and/or data flow control information need to transferred between devices. The example mechanisms disclosed herein may be used as an alternative to the method defined in ITU-T 999.1.

The first and second devices 310, 320 (e.g. a link layer device and a physical layer device) may be directly connected e.g. via a point-to-point connection between the devices 310, 320. Alternatively, there may be one or more network components between the first device 310 and the second device 320. In that case, the examples disclosed herein may be implemented if the network component(s) in the middle also supports the mechanism disclosed herein. The first and second devices 310, 320 are link partner devices in communication. A link partner device is a device in direct communication over a link established therebetween. The devices may be a physical layer device or a link layer device. The communication may be between two physical layer devices, between two link layer devices, or between a physical layer device and a link layer device.

Devices 310, 320 may support multiple streams simultaneously and identification information for packets or fragments of the packets and/or data flow control information may be transferred between the first device 310 and the second device 320. Each device 310, 320 includes a fragmentation unit 312, 322, a PCH unit 314, 324, a reassembly unit 316, 326, and a transceiver 318, 328, respectively. The fragmentation unit 312, 322 is configured to fragment a packet into multiple fragments if a size of the packet is greater than a maximum fragment size. If the size of the packet is not greater than the maximum fragment size, the packet may not be fragmented. The PCH unit 314, 324 is configured to generate a PCH for a packet or each fragment of the packet. The PCH may include at least one of a traffic control identifier field for identifying a data stream to which the packet belongs, a priority field for indicating a priority for the packet, or a data flow control field for congestion control between the devices 310, 320. The PCH may include any other information. The reassembly unit 316, 326 may reassemble fragments to a packet based on the information carried in the PCH. The transceiver 318, 328 is configured to send the packet or the fragments of the packet with the PCH via a connection 330 between the devices 310, 320. The transceiver 318, 328 may be configured to send the PCH in place of a preamble for bit-level synchronization at the link partner device.

The PCH may include a start of packet (SOP) field, a packet type field, an extension field type field, and an extension field, which will be explained in detail below. The traffic control identifier field, the priority field, and the data flow control field may be inserted into the extension field in the PCH. The packet type field may be set to a predetermined value to indicate that the packet or the fragment is sent with the PCH.

In one example, the data flow control field may include a first set of bits for indicating a group index of a data stream and a second set of bits for data flow control information for a group of data streams corresponding to the group index. The data flow control field may be sent in a round robin way for multiple groups of streams.

Figure 4A:
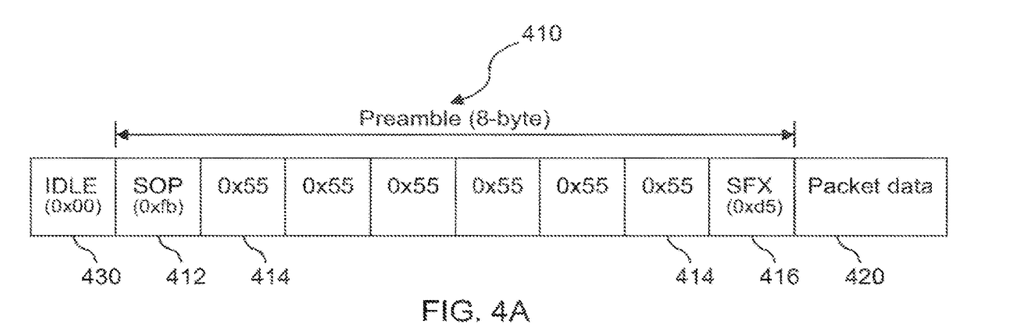
FIG. 4A shows a format of a conventional packet transferred between two devices.

FIG. 4A shows a format of a conventional packet transferred between two devices. A data frame (packet data) 420 is preceded by a preamble 410 (8 bytes). The preamble 410 includes a start of packet (SOP) 412, a pattern 414 of alternating 1s and 0s for allowing devices on the network to synchronize their receiver clocks and bit-level synchronization, and a start frame delimiter (SFD) 416. The SFD 416 is designed to break the bit pattern of the preamble and signal the start of the packet data. There is idle time 430 between packets. After a packet or fragment has been sent, transmitters are required to transmit a certain minimum of bits (e.g. 12 octets) of idle line state before transmitting the next packet/fragment.

Figure 4B:
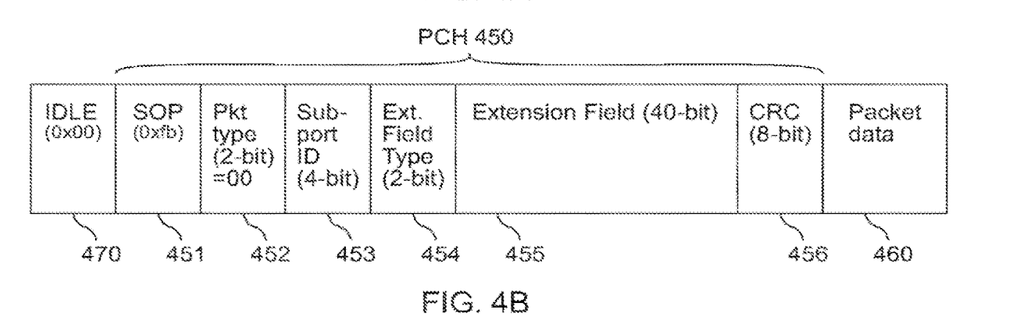
FIG. 4B shows an example format of a packet transferred between devices in accordance with one example.

FIG. 4B shows an example format of a packet or fragment transferred between devices 310, 320 in accordance with one example. The packet/fragment includes a PCH 450 and a packet data 460. The PCH 450 may be 8-bytes long, or alternatively any length may be used. In examples, the transmitting device (e.g. either a link layer device or a physical layer device) may replace the preamble 410 preceding the packet data 420 in FIG. 4A with the PCH 450. Instead of transmitting the preamble 410, the transmitting device may start with the PCH 450 followed by the packet data 460.

In one example, the PCH 450 may include an SOP field 451, a packet type field 452, a sub-port ID field 453, an extension field type field 454, an extension field 455, and a cyclic redundancy check (CRC) 456. The SOP field 451 may be set to a fixed value (e.g. 0xFB). The packet type field 452 (e.g. 2 bits) indicates the type of the packet. For example, the packet type field 452 may be set as follows: 00: Ethernet packet with packet specific information (e.g. the packet format as shown in FIG. 4B), 01: Ethernet packet without packet specific information (compatible with the preamble format shown in FIG. 4A), 10: idle packet with status, and 11: reserved.

The extension field type field 454 (e.g. 2 bits) indicates the type of the extension field 455. The extension field type field 454 may be set as follows: 00: ignore the extension field, 01: the extension field carries time stamp, 10: user-defined information type 1 (as an example), and 11: user-defined information type 2 (as an example). The extension field 455 (e.g. 40 bits) carries data defined by the extension field type field 454, (e.g. time stamp).

Figure 5:
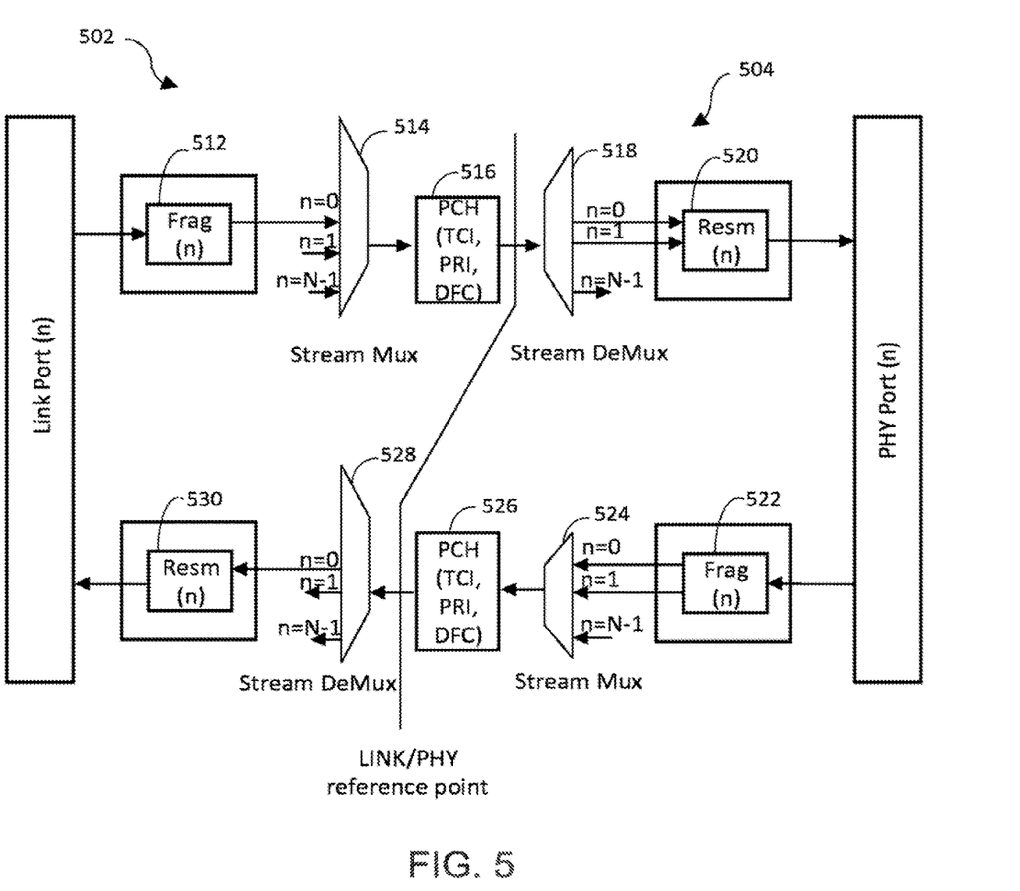
FIG. 5 shows the reference model for the interface between a link layer device and a physical layer device in accordance with one example.

FIG. 5 shows the reference model for the interface between a link layer device and a physical layer device in accordance with one example. A link layer device 502 may pass a data packet to a physical layer device 504, or vice versa. The link layer device 502 and the physical layer device 504 may support a plurality of streams simultaneously. A packet is a block of data consisting of a certain number of octets for transport between a physical layer port and a link layer port.

For the transmission of data packets from the link layer device 502 to the physical layer device 504, the fragmentation function 512 in the link layer device 502 may divide the packet to multiple fragments if the size of the packet exceeds the maximum fragment size. If the length of the packet is less than or equal to the maximum fragment size, the packet may be transmitted without fragmentation. Data packets on the plurality of streams are multiplexed by the multiplexer 514. The PCH function 516 generates, and appends, a PCH to each packet or fragment of the packet. An example structure of the PCH is shown in FIG. 4B.

The PCH function 516 may add in the extension field 455 of the PCH at least one of a TCI field, a priority field, and/or a DFC field, or any additional information. The TCI field may include a start of fragment (SoF) field (1 bit), an end of fragment (EoF) field (1 bit), and a stream identification (SID) field (e.g. 10 bits to support 1024 streams between the link layer device 502 and the physical layer device 504). The extension field type field 454 in the PCH may be set to "10" or "11" to indicate that the packet is transmitted with the PCH. Alternatively, the extension field type field 454 may be set to a different value that is mutually agreed with between the devices 502, 504.

The priority field may indicate a priority of the packet/fragment (e.g. 3 bits) for QoS control. The DFC field may be included in the PCH for controlling data flow from the physical layer device 504 to the link layer device 502. Alternatively, the data flow control for the data flow from the physical layer device 504 to the link layer device 502 may not be implemented. The link layer device 502 sends a packet or fragment with the PCH to the physical layer device 504. If there is no data packet to be transferred and DFC information is changed for any stream, an idle packet (a packet without payload data) with DFC carried in the PCH may be generated and transferred between the devices 502, 504.

In the physical layer device 504, the packets/fragments on multiple streams are demultiplexed by the demultiplexer 518. The reassembly unit 520 of the physical layer device 504 reassembles fragments to a packet based on the TCI field in the PCH.

For the transmission of data packets from the physical layer device 504 to the link layer device 502, the same functions described above are performed in the physical layer device 504 and the link layer device 502. The fragmentation function 522 in the physical layer device 504 may divide the packet to multiple fragments if the size of the packet exceeds the maximum fragment size. If the length of the packet is less than or equal to the maximum fragment size, the packet may be transmitted without fragmentation. Data packets on the plurality of streams are multiplexed by the multiplexer 524. The PCH function 526 in the physical layer device 504 generates, and appends, a PCH to each packet or fragment of the packet. An example structure of the PCH is shown in FIG. 4B.

The PCH function 526 may add in the extension field 455 of the PCH at least one of a TCI field, a priority field, and/or a DFC field, or any additional information. The TCI field may include an SoF field (1 bit), an EoF field (1 bit), and an SID field (e.g. 10 bits to support 1024 streams between the link layer device 502 and the physical layer device 504). The extension field type field 454 in the PCH may be set to "10" or "11" to indicate that the packet is transmitted with the PCH. Alternatively, the extension field type field 454 may be set to a different value that is mutually agreed with between the devices 502, 504. The priority field may indicate a priority of the packet/fragment (e.g. 3 bits) for QoS control. The DFC field may be included in the PCH for controlling data flow from the link layer device 502 to the physical layer device 504. The physical layer device 504 sends a packet or fragment with the PCH to the link layer device 502. If there is no data packet to be transferred and DFC information is changed for any stream, an idle packet with DFC carried in the PCH may be generated and transferred between the devices 502, 504.

In the link layer device 502, the packets/fragments on multiple streams are demultiplexed by the demultiplexer 528. The reassembly unit 530 of the link layer device 502 reassembles fragments to a packet based on the TCI field in the PCH.

The examples disclosed herein do not require a separate identification tag, Ethernet header encapsulation, FCS generation and insertion, and the corresponding reverse actions in a link partner device. The examples do not require separate pause frame generation and insertion, and the corresponding reverse action in a link partner device. The transport mechanism in accordance with the examples disclosed herein may carry identification (e.g. start of fragment, end of fragment, stream ID), priority information, and/or DFC information in the PCH field that is transported in place of a preamble for a packet/fragment.

The mechanism in accordance with the examples disclosed herein, compared with the methods defined in ITU-T G.999.1, has no interface overhead for data frame and data flow control frame. In addition, implementation complexity is reduced in the mechanism in accordance with the examples disclosed herein. At the transmit side, tagging, Ethernet header encapsulation, FCS generation and insertion are not required in the examples. At the receive side, un-tagging, Ethernet header de-capsulation, FCS verification and removal are not required. The PCH (e.g. 8 bytes) may carry additional information that is not defined by the ITU-T G.999.1. For example, priority information which may improve overall QoS in the link layer and/or the physical layer may be additionally transferred between the devices.

N streams may be supported between the link layer device 502 and the physical layer device 504. Each of the N streams requires one DFC bit. In the example PCH format shown in FIG. 4B, there are 40 bits in the extension field 455 in the PCH 450. If, in accordance with one example, the TCI field and the priority field use 15 bits (10 bits for SID, 1 bit for SOF, 1 bit for EOF, 3 bits for priority, as an example), 25 bits are left for the DFC.

In order to support up to 1024 streams, the streams may be divided into multiple groups. In one example, the streams may be divided into 64 groups, each group with 16 streams. With 64 16-stream groups, 1024 streams can be supported. The DFC field in the PCH may be partitioned into two parts: one part for the stream group index (e.g. 6 bits for 64 groups) and the other part for DFC information for a specific stream group (e.g. 16 bits for 16 streams). The DFC group index indicates the index of the selected stream group, and the DFC information part are bit maps for the streams of the selected group. The DFC information of all streams in the selected group is indicated by the DFC group index.

If a DFC state of any stream within one group has changed, the DFC information of that group is selected to be carried in the PCH of the next data packet or fragment if there is a data packet to be sent. In this case, the packet type field 452 in the PCH may be set to "00." If there is no data packet to be transferred and there is any DFC change, an idle packet with the PCH may be generated. In this case, the packet type field 452 in the PCH may be set to "10." If a DFC state changes in multiple stream groups, a round robin mechanism may be used for selecting the stream group among all the stream groups with DFC state change. If there is no DFC state change for a specific stream group, the DFC field of a data packet may carry DFC information of any stream group. The PCH may be transmitted in place of a preamble preceding packet data. The packet with the PCH may be transmitted without preamble.

Figure 6:
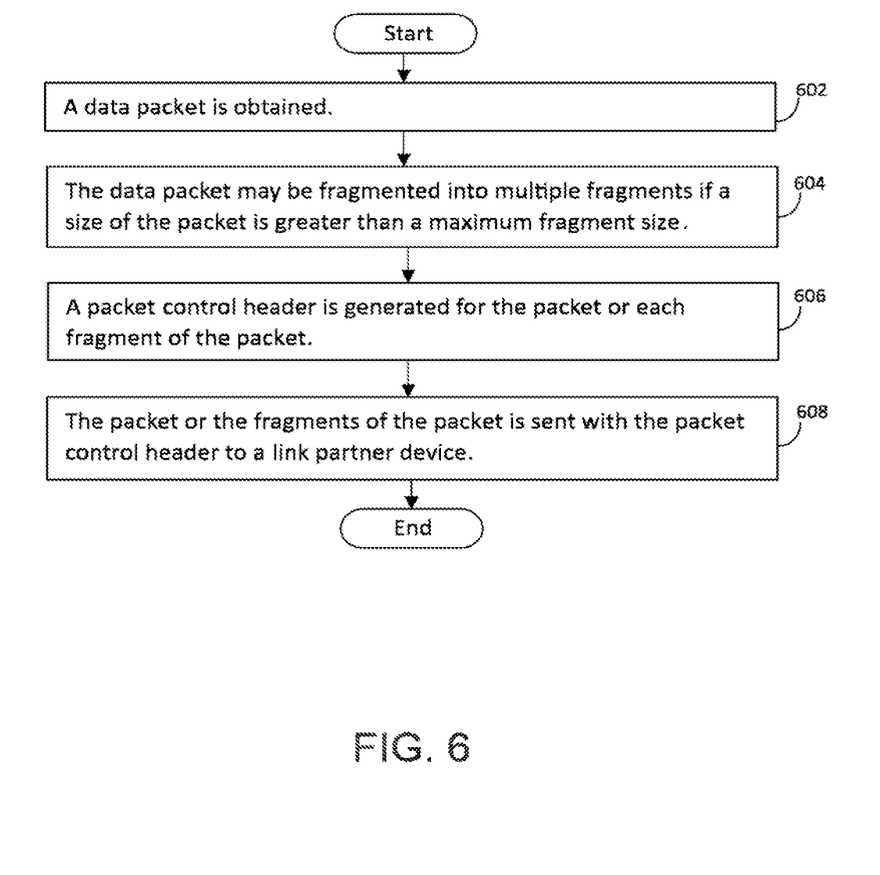
FIG. 6 is a flow diagram of an example process of interfacing between devices.

FIG. 6 is a flow diagram of an example process of interfacing between devices. A data packet is obtained (602). The data packet may be fragmented into multiple fragments if a size of the packet is greater than a maximum fragment size (604). A packet control header is generated for the packet or each fragment of the packet (606). The packet control header may include at least one of a traffic control identifier field for identifying a data stream to which the packet belongs, a priority field for indicating a priority for the packet, and/or a data flow control field for congestion control between the devices. The packet or the fragments of the packet is sent with the packet control header to a link partner device (608).

The packet control header may be sent in place of a preamble for bit-level synchronization at the link partner device. The packet control header may include an SOP field, a packet type field, an extension field type field, and an extension field. The traffic control identifier field, the priority field, and the data flow control field may be inserted into the extension field. The packet type field may indicate that the packet or the fragments is sent with the packet control header.

The data flow control field may include a first set of bits for indicating a group index of a data stream and a second set of bits for data flow control information for a group of data streams corresponding to the group index. The data flow control field may be sent in a round robin way for multiple groups of streams.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a device for communicating with a link partner device. The device includes a fragmentation unit, a packet control header unit, and a transceiver. The fragmentation unit is configured to fragment a packet into multiple fragments if a size of the packet is greater than a maximum fragment size. The packet control header unit is configured to generate a packet control header for a packet or each fragment of the packet. The packet control header may include at least one of a traffic control identifier field for identifying a data stream to which the packet belongs, a priority field for indicating a priority for the packet, or a data flow control field for congestion control between the device and the link partner device. The transceiver is configured to send the packet or the fragments of the packet with the packet control header via a connection between the device and the link partner device.

Example 2 is the device of example 1, wherein the transceiver is configured to send the packet control header in place of a preamble for bit-level synchronization at the link partner device.

Example 3 is the device as in any one of examples 1-2, wherein the packet control header includes a start of packet field, a packet type field, an extension field type field, and an extension field, wherein the traffic control identifier field, the priority field, and the data flow control field are inserted into the extension field.

Example 4 is the device of example 3, wherein the packet type field indicates that the packet or the fragments is sent with the packet control header.

Example 5 is the device as in any one of examples 1-4, wherein the data flow control field includes a first set of bits for indicating a group index of a data stream and a second set of bits for data flow control information for a group of data streams corresponding to the group index.

Example 6 is the device of example 5, wherein the data flow control field is sent in a round robin way for multiple groups of streams among stream groups with data flow control state change.

Example 7 is the device as in any one of examples 1-6, wherein the device is either a physical layer device or a link layer device.

Example 8 is the device as in any one of examples 1-7, wherein if there is no data to be transferred and a data flow control status changes for any data stream, an idle packet is transferred with the packet control header.

Example 9 is the device as in any one of examples 1-8, further including a reassembly unit configured to reassemble fragments to a packet based on the packet control header.

Example 10 is a method for interfacing between devices. The method includes obtaining a data packet, fragmenting the packet into multiple fragments if a size of the packet is greater than a maximum fragment size, generating a packet control header for the packet or each fragment of the packet, wherein the packet control header includes at least one of a traffic control identifier field for identifying a data stream to which the packet belongs, a priority field for indicating a priority for the packet, or a data flow control field for congestion control between the devices, and sending the packet or the fragments of the packet with the packet control header to a link partner device.

Example 11 is the method of example 10, wherein the packet control header is sent in place of a preamble for bit-level synchronization at the link partner device.

Example 12 is the method as in any one of examples 10-11, wherein the packet control header includes a start of packet field, a packet type field, an extension field type field, and an extension field, wherein the traffic control identifier field, the priority field, and the data flow control field are inserted into the extension field.

Example 13 is the method of example 12, wherein the packet type field indicates that the packet or the fragments is sent with the packet control header.

Example 14 is the method as in any one of examples 10-13, wherein the data flow control field includes a first set of bits for indicating a group index of a data stream and a second set of bits for data flow control information for a group of data streams corresponding to the group index.

Example 15 is the method of example 14, wherein the data flow control field is sent in a round robin way for multiple groups of streams among stream groups with data flow control state change.

Example 16 is a computer program having a program code for performing at least one of the methods as in any one of examples 10-15.

Example 17 is a machine-readable storage including machine readable instructions, when executed, to implement a method or realize an apparatus as in any one of examples 1-15.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP)

hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method, comprising:
   obtaining a frame;
   in response to the frame satisfying a threshold frame size, fragmenting the frame into multiple fragments;
   generating a control header for the frame or the multiple fragments, the control header including information to control a quality of service of the frame or the multiple fragments;
   identifying a plurality of streams to use to transmit the frame or the multiple fragments to a linked device; and
   sending the frame or the multiple fragments using the plurality of streams to the linked device.

2. The method of claim 1, further comprising:
   demultiplexing the frame or the multiple fragments for each stream of the plurality of streams; and
   including reassembly information in the control header associated with the demultiplexed frame or the multiple fragments.

3. The method of claim 2, further comprising reassembling fragments of the multiple fragments into a frame using the reassembly information in the control header.

4. The method of claim 1, further comprising:
   preparing a pause frame to transmit to the linked device; and
   sending the pause frame to the linked device to control data flow and prevent congestion in a stream of the plurality of streams.

5. The method of claim 4, wherein a field of the pause frame comprises information identifying a particular stream of the plurality of streams over which the pause frame will be transmitted.

6. The method of claim 1, wherein the control header includes at least one of: a sub-port ID field, an extension field type field, or an extension field.

7. The method of claim 6, wherein a traffic control identifier field, a priority field, and a data flow control field are inserted into the extension field.

8. The method of claim 1, wherein:
   the control header includes a frame type field; and
   the frame type field indicates that the frame or the multiple fragments are sent with the control header.

9. The method of claim 1, wherein the frame or the multiple fragments are assigned to a particular stream of the plurality of streams based on the quality of service and a capacity of the particular stream.

10. The method of claim 1, wherein the linked device is a physical layer device.

11. A device for communicating with a linked device, comprising:
    a fragmentation unit operable to fragment a frame into multiple fragments if the frame satisfies a threshold frame size;
    a control header unit operable to:
       generate a control header for the frame or the multiple fragments; and
       identify a plurality of streams to use to transmit the frame or the multiple fragments to the linked device, wherein the control header includes information to control a quality of service of the frame or the multiple fragments; and
    a transceiver operable to send the frame or the multiple fragments using the plurality of streams to the linked device.

12. The device of claim 11, further comprising a demultiplexer, operable to demultiplex the frame or the multiple fragments for each stream of the plurality of streams, wherein reassembly information is included in the control header associated with the demultiplexed frame or the multiple fragments.

13. The device of claim 12, further comprising a reassembly unit operable to reassemble fragments of the multiple fragments into a frame using the reassembly information in the control header.

14. The device of claim 11, wherein the control header unit is further operable to:
    prepare a pause frame to transmit to the linked device; and
    send the pause frame to the linked device to control data flow and prevent congestion in a stream of the plurality of streams.

15. The device of claim 14, wherein a field of the pause frame comprises information identifying a particular stream of the plurality of streams over which the pause frame will be transmitted.

16. The device of claim 11, wherein the control header includes at least one of: a sub-port ID field, an extension field type field, or an extension field.

17. The device of claim 16, wherein a traffic control identifier field, a priority field, and a data flow control field are inserted into the extension field.

18. The device of claim 11, wherein:
the control header includes a frame type field; and
the frame type field indicates that the frame or the multiple fragments are sent with the control header.

19. The device of claim 11, wherein the frame or the multiple fragments are assigned to a particular stream of the plurality of streams based on the quality of service and a capacity of the particular stream.

20. The device of claim 11, wherein the linked device is a physical layer device.

* * * * *